E. W. SCOTT.
WHIP HOLDER FOR CARRIAGES.
No. 110,503. Patented Dec. 27, 1870.
 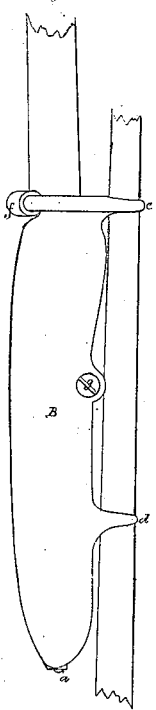 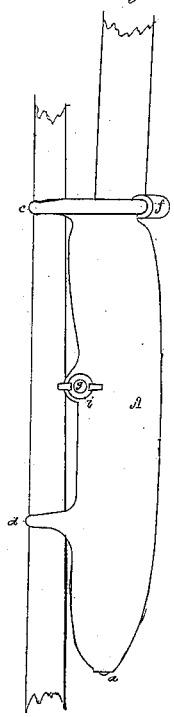 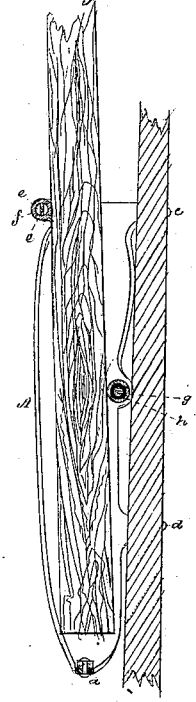
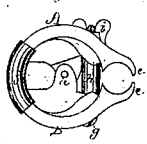 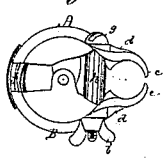 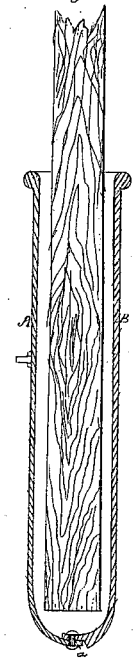 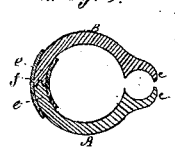
Witnesses
S. N. Piper
L. N. Möller
E. W. Scott
by his attorney
R. H. Eddy

United States Patent Office.

ERASTUS W. SCOTT, OF WAUREGAN, CONNECTICUT.

Letters Patent No. 110,503, dated December 27, 1870.

IMPROVEMENT IN WHIP-HOLDERS FOR CARRIAGES.

The Schedule referred to in these Letters Patent and making part of the same.

*To all persons to whom these presents may come:*

Be it known that I, ERASTUS W. SCOTT, of Wauregan, of the county of Windham and State of Connecticut, have made a new and useful Invention having reference to Whip-Holders for Carriages; and do hereby declare the same to be fully described in the following specification and represented in the accompanying drawing, of which Figure 1 is a side view;
Figure 2, a front elevation;
Figure 3, a rear elevation;
Figure 4, a vertical section;
Figure 5, a top view;
Figure 6, a bottom view; and
Figure 7, a transverse section of a whip-socket or holder, made in accordance with my invention.
Figure 8 is a horizontal section taken through its upper jaws.

The body of the whip-holder is composed of two parts or leaves, A B, shaped as represented and pivoted or hinged together, as shown at $a$.

Each leaf, A B, has two jaws or prongs, $c\ d$, extended from it, one being at its top and the other a short distance from its bottom.

Furthermore, there are at the tops of the two leaves A B two curved projections, $e\ e$, which enter a tubular cushion, $f$, the whole being arranged in manner as represented.

At the rear of and about the middle of the two leaves a screw or screw-bolt, $g$, is arranged, it going through both leaves and a tubular cushion, $h$, placed between them. A nut $i$ is screwed on the bolt.

The lower part of each leaf is formed tapering, to serve as a support to the end of a whip when within the holder, the whip while therein being forced by the tapering bottom against the two cushions $f$ and $h$.

The prongs $c\ c\ d\ d$ of the leaves A B are for the purpose of fastening the whip-holder to the frame of a carriage-dasher.

By applying the said prongs to one of the end upright bars of such frame so as to clasp it, and setting up the clamp-nut $i$ on the screw-bolt, the whip-holder may be firmly secured to the dasher.

Each of the leaves is concavo convex in a transverse direction, in order that it with its fellow may form a socket for receiving a whip.

From the above it will be seen that the whip-holder as described is not only capable of being readily fixed to a carriage-dasher or removed therefrom, as occasion may require, but, owing to its peculiar construction, it will hold a whip steady while such whip may be within it.

The cushions not only operate to prevent abrasion of the whip, but one of them, viz., the lower one, answers as a spring to force the leaves apart while the contracting nut may be in the act of being unscrewed, each of such cushions being a tube of India rubber or other proper elastic material.

I claim as my invention—

The whip-holder as composed of two leaves, A B, provided with the prongs $c\ c\ d\ d$, cushions $f\ h$, and contractile screw $g$, and nut $i$, and formed and connected together all substantially in manner and so as to operate as set forth.

ERASTUS W. SCOTT.

Witnesses:
WILLIAM DYER,
SARAH J. DYER.